US012683751B2

(12) United States Patent
Liang et al.

(10) Patent No.: US 12,683,751 B2
(45) Date of Patent: Jul. 14, 2026

(54) METHOD AND APPARATUS FOR DETERMINING MONITORING CAPABILITY, DEVICE, AND STORAGE MEDIUM

(71) Applicant: GUANGDONG OPPO MOBILE TELECOMMUNICATIONS CORP., LTD., Dongguan (CN)

(72) Inventors: Bin Liang, Dongguan (CN); Jing Xu, Dongguan (CN); Yi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 307 days.

(21) Appl. No.: 18/479,764

(22) Filed: Oct. 2, 2023

(65) Prior Publication Data

US 2024/0031115 A1      Jan. 25, 2024

Related U.S. Application Data

(63) Continuation of application No. PCT/CN2021/087307, filed on Apr. 14, 2021.

(51) Int. Cl.
*H04L 5/00* (2006.01)
*H04W 72/232* (2023.01)

(52) U.S. Cl.
CPC ......... *H04L 5/0094* (2013.01); *H04W 72/232* (2023.01); *H04L 5/0035* (2013.01)

(58) Field of Classification Search
CPC ... H04L 5/0035; H04L 5/0094; H04W 72/232
See application file for complete search history.

(56) References Cited

U.S. PATENT DOCUMENTS

2021/0037502 A1   2/2021  Tsai et al.
2023/0156741 A1*  5/2023  Fu ........................... H04L 5/001
                                                                370/329

FOREIGN PATENT DOCUMENTS

CN       110972291 A       4/2020
CN       111884755        11/2020
                (Continued)

OTHER PUBLICATIONS

EPO, Extended European Search Report issued for EU Application No. 21936406.4, Mar. 28, 2024.
(Continued)

*Primary Examiner* — Brian P Cox
(74) *Attorney, Agent, or Firm* — Hodgson Russ LLP

(57) ABSTRACT

The present application relates to the field of mobile communications, and discloses a method and apparatus for determining a monitoring capability, a device, and a storage medium. The method comprises: determining a first monitoring capability and/or a second monitoring capability, wherein the first monitoring capability is a capability of a terminal device to monitor, on a first carrier, a physical downlink control channel (PDCCH) used for scheduling the first carrier, and the second monitoring capability is a capability of the terminal device to monitor, on a second carrier, the PDCCH used for scheduling the first carrier; or the first monitoring capability is a capability of the terminal device to monitor, on the first carrier and the second carrier, the PDCCH used for scheduling the first carrier; the first carrier and the second carrier are used for scheduling the first carrier; and the first carrier and the second carrier are different.

19 Claims, 2 Drawing Sheets

(56) References Cited

FOREIGN PATENT DOCUMENTS

| CN | 113518454 | 10/2021 |
|----|-----------|---------|
| WO | 2020087310 | 5/2020 |
| WO | 2021062687 A1 | 4/2021 |

OTHER PUBLICATIONS

Oppo, "Discussion on cross-carrier scheduling from Scell to Pcell," 3GPP TSG RAN WG1 #104-e, R1-2100186, Jan. 2021.
Huawei et al., "Discussion on SCell PDCCH scheduling P(S)Cell PDSCH or PUSCH," 3GPP TSG RAN WG1 Meeting #104bis-e, R1-2102309, Apr. 2021.
WIPO, International Search Report and Written Opinion for PCT/CN2021/087307, Dec. 17, 2021.

\* cited by examiner

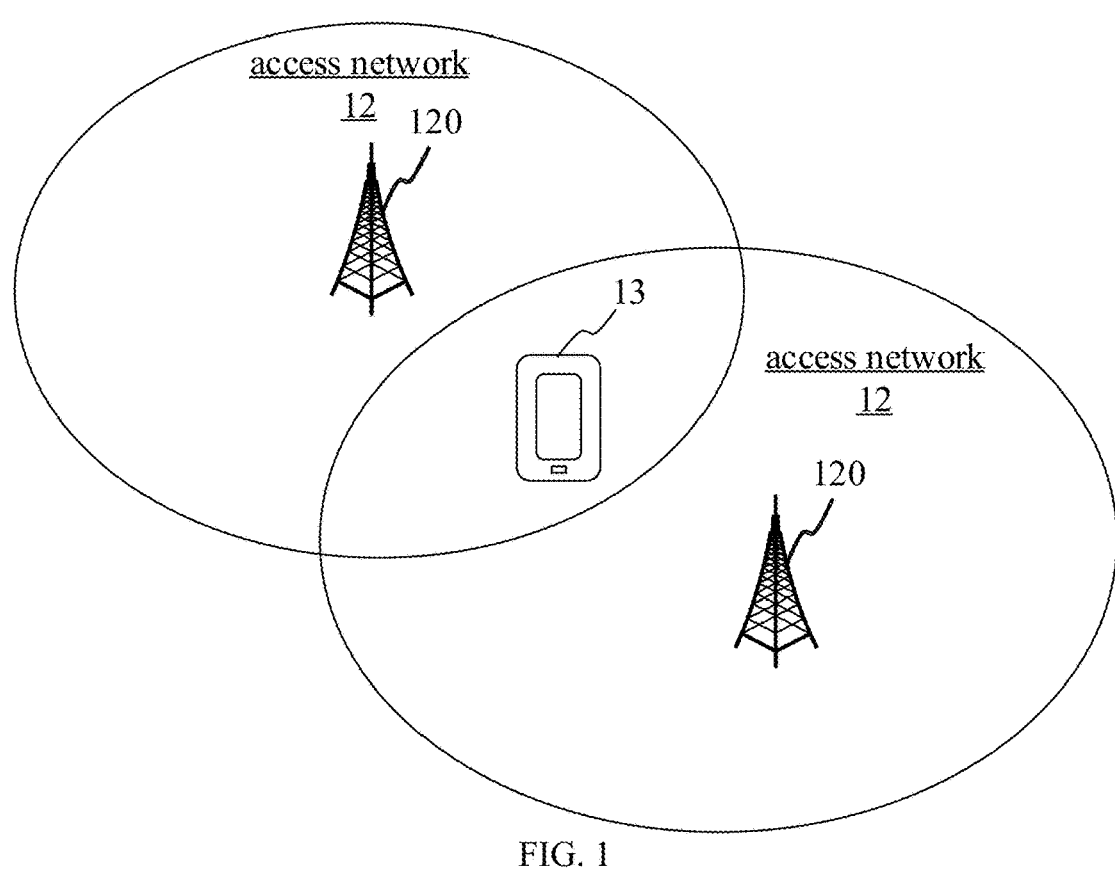
FIG. 1
determining, by a terminal device, a first monitoring
capability and/or a second monitoring capability
210
FIG. 2
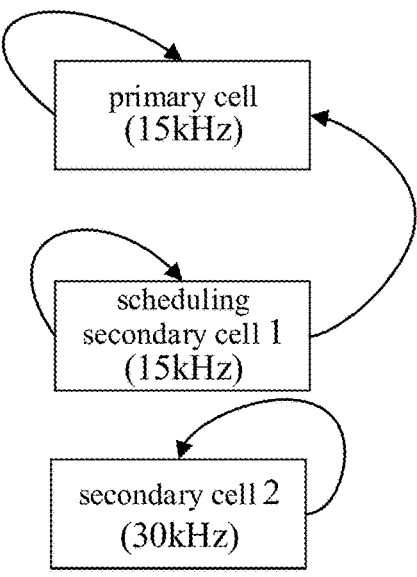
FIG. 3

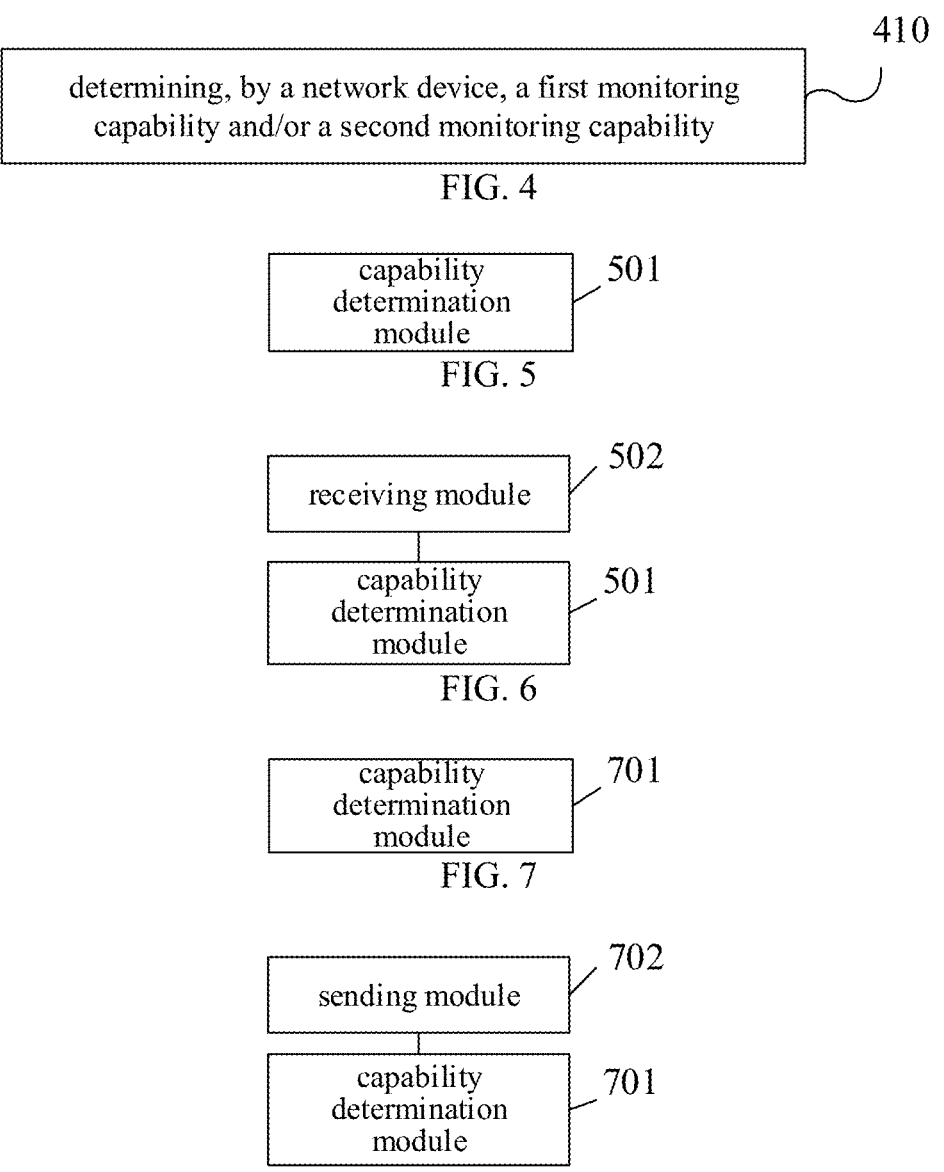
410
determining, by a network device, a first monitoring
capability and/or a second monitoring capability
FIG. 4
capability
determination
module 501
FIG. 5
receiving module 502
capability
determination
module 501
FIG. 6
capability
determination
module 701
FIG. 7
sending module 702
capability
determination
module 701
FIG. 8
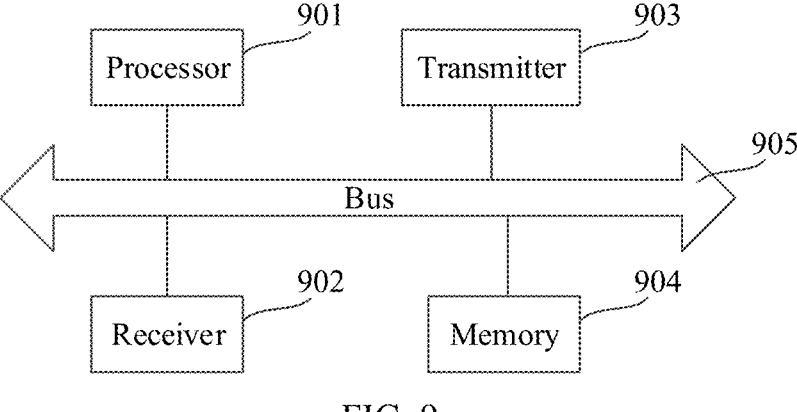
Processor 901          Transmitter 903
Bus 905
Receiver 902          Memory 904
FIG. 9

METHOD AND APPARATUS FOR DETERMINING MONITORING CAPABILITY, DEVICE, AND STORAGE MEDIUM

CROSS REFERENCE TO RELATED APPLICATION(S)

This application is a continuation of International Application No. PCT/CN2021/087307 filed on Apr. 14, 2021, the entire disclosure of which is hereby incorporated by reference.

TECHNICAL FIELD

The present disclosure relates to the field of mobile communications, and more particularly, to a method and apparatus for determining a monitoring capability, a device, and a storage medium.

BACKGROUND

In multi-carrier aggregation scenarios, network devices configure carriers for terminal devices, and schedule the carriers configured for the terminal devices through scheduling carriers, and the terminal devices determine, according to the carriers configured for the terminal devices, monitoring capabilities of the terminals for monitoring, on the scheduling carriers, Physical Downlink Control Channels (PDCCHs) configured to schedule the scheduled carriers. The terminals perform PDCCH monitoring in the scheduling carriers, and the number of monitoring does not exceed the corresponding monitoring capability.

In New Radio (NR) systems, in order to reduce PDCCH loads of the scheduling carriers, the network devices configure two scheduling carriers for the terminals, and these two scheduling carriers can schedule the same carrier configured for the terminal devices. In this case, the terminal devices cannot determine a monitoring capability of each scheduling carrier.

SUMMARY

Embodiments of the present disclosure provide a method and apparatus for determining a monitoring capability, a device, and a storage medium, which break limitations that the monitoring capability cannot be determined for two scheduling carriers that schedule the same carrier, thereby improving the capability of a terminal to monitor a PDCCH and improving communication effect. Technical solutions are as follows.

According to an aspect of the present disclosure, there is provided a method for determining a monitoring capability, which is applied to a terminal device, and the method includes: determining a first monitoring capability and/or a second monitoring capability.

The first monitoring capability is a capability of the terminal device to monitor, on a first carrier, a PDCCH configured to schedule the first carrier, and the second monitoring capability is a capability of the terminal device to monitor, on a second carrier, the PDCCH configured to schedule the first carrier.

Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier.

According to an aspect of the present disclosure, there is provided a method for determining a monitoring capability, which is applied to a network device, and the method includes: determining a first monitoring capability and/or a second monitoring capability.

The first monitoring capability is a capability of a terminal device to monitor, on a first carrier, a PDCCH configured to schedule the first carrier, and the second monitoring capability is a capability of the terminal device to monitor, on a second carrier, the PDCCH configured to schedule the first carrier.

Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier.

According to an aspect of the present disclosure, there is provided an apparatus for determining a monitoring capability, which is provided in a terminal device, and the apparatus includes: a capability determination module, configured to determine a first monitoring capability and/or a second monitoring capability.

The first monitoring capability is a capability of the terminal device to monitor, on a first carrier, a PDCCH configured to schedule the first carrier, and the second monitoring capability is a capability of the terminal device to monitor, on a second carrier, the PDCCH configured to schedule the first carrier.

Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier.

According to an aspect of the present disclosure, there is provided an apparatus for determining a monitoring capability, which is provided in a network device, and the apparatus includes: a capability determination module, configured to determine a first monitoring capability and/or a second monitoring capability.

The first monitoring capability is a capability of a terminal device to monitor, on a first carrier, a PDCCH configured to schedule the first carrier, and the second monitoring capability is a capability of the terminal device to monitor, on a second carrier, the PDCCH configured to schedule the first carrier.

Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier.

According to an aspect of the present disclosure, there is provided a terminal device, including a processor, a transceiver connected to the processor, and a memory configured to store executable instructions for the processor. The processor is configured to load and execute the executable instructions to perform the method for determining the monitoring capability as described in the above aspect.

According to an aspect of the present disclosure, there is provided a network device, including a processor, a transceiver connected to the processor, and a memory configured to store executable instructions for the processor. The processor is configured to load and execute the executable instructions to perform the method for determining the monitoring capability as described in the above aspect.

According to an aspect of the present disclosure, there is provided a computer-readable storage medium, having executable program codes stored thereon. The executable program codes are loaded and executed by a processor to implement the method for determining the monitoring capability as described in the above aspect.

According to an aspect of the present disclosure, there is provided a chip, including a programmable logic circuit and/or program instructions. The chip is configured to, when running on a terminal device or a network device, implement the method for determining the monitoring capability as described in the above aspect.

According to an aspect of the present disclosure, there is provided a computer program product, which is configured to, when executed by a processor of a terminal device or a network device, implement the method for determining the monitoring capability as described in the above aspect.

The technical solutions provided by embodiments of the present disclosure at least include the following beneficial effects.

According to the method, the apparatus, the device, and the storage medium provided by embodiments of the present disclosure, the first monitoring capability and/or the second monitoring capability are directly determined, and the first monitoring capability and/or the second monitoring capability are used for indicating the capability of the terminal device to monitor the PDCCH on the first carrier and the second carrier. This breaks the limitations that the monitoring capability cannot be determined for the two scheduling carriers that schedule the same carrier, thereby improving the capability of the terminal to monitor the PDCCH and improving the communication effect.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings may be obtained from these drawings without creative efforts.

FIG. 1 illustrates a block diagram of a communication system provided by an exemplary embodiment of the present disclosure.

FIG. 2 illustrates a flowchart of a method for determining a monitoring capability provided by an exemplary embodiment of the present disclosure.

FIG. 3 illustrates a schematic diagram of cell scheduling provided by an exemplary embodiment of the present disclosure.

FIG. 4 illustrates a flowchart of a method for determining a monitoring capability provided by an exemplary embodiment of the present disclosure.

FIG. 5 illustrates a block diagram of an apparatus for determining a monitoring capability provided by an exemplary embodiment of the present disclosure.

FIG. 6 illustrates a block diagram of an apparatus for determining a monitoring capability provided by an exemplary embodiment of the present disclosure.

FIG. 7 illustrates a block diagram of an apparatus for determining a monitoring capability provided by an exemplary embodiment of the present disclosure.

FIG. 8 illustrates a block diagram of an apparatus for determining a monitoring capability provided by an exemplary embodiment of the present disclosure.

FIG. 9 illustrates a schematic structural diagram of a communication device provided by an exemplary embodiment of the present disclosure.

DETAILED DESCRIPTION

In order to make objectives, technical solutions, and advantages of the present disclosure clearer, implementations of the present disclosure will be further described in detail below with reference to the drawings.
Monitoring Capability After a network device configures a carrier for a terminal device, the terminal device can determine, according to the configured carrier, a monitoring capability for monitoring a PDCCH within a scheduling carrier, where the PDCCH is configured to schedule a scheduled carrier. The monitoring capability may be the number of PDCCH monitoring, or the number of non-overlapping Control Channel Elements (CCEs) used for channel estimation.

It should be noted that the number of PDCCH monitoring involved in embodiments of the present disclosure is actually the number of PDCCH blind decoding performed by the terminal device, which is not limited in embodiments of the present disclosure.

First, an application scenario of the present disclosure is explained.

FIG. 1 illustrates a block diagram of a communication system provided by an illustrative embodiment of the present disclosure. The communication system may include an access network 12 and a terminal device 13.

A plurality of network devices 120 is included in the access network 12. The network devices 120 may be a base station, where the base station is a device deployed in an access network to provide a wireless communication function for a terminal device. The base station may include various forms of macro base station, micro base station, relay station, access point, and the like. In a system with different wireless access technologies adopted, names of devices having base station functions may be different. For example, in LTE systems, the devices are called eNodeB or eNB; and in 5G NR-U systems, the devices are called gNodeB or gNB. With the evolution of communication technology, the description of a name "base station" may change. For the convenience of embodiments of the present disclosure, the above-mentioned devices configured to provide wireless communication functions for terminal devices 13 are collectively referred to as access network devices.

The terminal device 13 may include various handheld devices, vehicle-mounted devices, wearable devices, computing devices having wireless communication functions, or other processing devices connected to wireless modems, and various forms of user equipment (UE), mobile station (MS), terminal device, and so on. For convenience of description, the above-mentioned devices are collectively referred to as terminal devices. The access network devices 120 and the terminal device 13 communicate with each other through a certain air interface technology, such as a Uu interface.

The technical solutions in embodiments of the present disclosure are applicable to various communication systems, for example, a global system of mobile communication (GSM) system, a code division multiple access (CDMA)

system, a wideband code division multiple access (WCDMA) system, a general packet radio service (GPRS) system, a long term evolution (LTE) system, a LTE frequency division duplex (FDD) system, a LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), a wireless fidelity (WiFi), a next-Generation communication system, or other communication systems.

Generally speaking, a conventional communication system generally supports a limited number of connections, and therefore is easy to implement. However, with development of the communication technology, a mobile communication system will not only support conventional communication, but also support, for example, device to device (D2D) communication, machine to machine (M2M) communication, machine type communication (MTC), vehicle to vehicle (V2V) communication, or vehicle to everything (V2X) system, etc. Embodiments of the present disclosure may also be applied to these communication systems.

FIG. 2 illustrates a flowchart of a method for determining a monitoring capability provided by an exemplary embodiment of the present disclosure, which is applied to the terminal device shown in FIG. 1. Referring to FIG. 2, the method includes at least some of the following contents.

In 210, the terminal device determines a first monitoring capability and/or a second monitoring capability.

The first monitoring capability is a capability of the terminal device to monitor, on a first carrier, a PDCCH configured to schedule the first carrier, and the second monitoring capability is a capability of the terminal device to monitor, on a second carrier, the PDCCH configured to schedule the first carrier. Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier. If a frequency point corresponding to the first carrier is different from a frequency point corresponding to the second carrier, it indicates that the first carrier is different from the second carrier. Alternatively, if a carrier identity corresponding to the first carrier is different from a carrier identity corresponding to the second carrier, it indicates that the first carrier is different from the second carrier. The carrier identity is used to identify the carrier. For example, the carrier identity is 1, 2, 3 or other numerical values.

In embodiments of the present disclosure, the network device configures a plurality of carriers for the terminal device, and the configured first carriers may be scheduled by the first carrier and the second carrier. This also means that the first carrier may be scheduled by itself or by the second carrier in a cross-carrier scheduling manner.

In some embodiments, the first monitoring capability or the second monitoring capability is the number of PDCCH monitoring. Alternatively, the first monitoring capability or the second monitoring capability is the number of non-overlapping CCEs used for channel estimation. The number of CCEs is set by the network device, or set by an operator, or set in other ways, which is not limited in embodiments of the present disclosure.

If the first monitoring capability is the number of PDCCH monitoring, the first monitoring capability is used for indicating the number of PDCCH blind decoding performed by the terminal devices on the first carrier, or for indicating the number of candidate PDCCHs monitored by the terminal device on the first carrier. If the first monitoring capability is the number of non-overlapping CCEs used for channel estimation, the first monitoring capability is used for indicating the number of non-overlapping CCEs that the terminal device uses to perform the channel estimation on the first carrier.

If the second monitoring capability is the number of PDCCH monitoring, the second monitoring capability is used for indicating the number of PDCCH blind decoding performed by the terminal devices on the second carrier, or for indicating the number of candidate PDCCHs monitored by the terminal device on the second carrier. If the second monitoring capability is the number of non-overlapping CCEs used for channel estimation, the second monitoring capability is used for indicating the number of non-overlapping CCEs that the terminal device uses to perform the channel estimation on the second carrier.

It should be noted that, embodiments of the present disclosure only take the first carrier and the second carrier as an example for illustration. In another embodiment, the first carrier and the second carrier may also be replaced by a first cell and a second cell. That is, the carrier and the cell are equivalent concepts, and the carrier and the cell may be replaced equally, which are not limited by embodiments of the present disclosure.

In some embodiments, the terminal device receives configuration information, and the configuration information is used for indicating the first carrier and the second carrier that are configured to schedule the first carrier. In this case, the terminal device may determine the first carrier and the second carrier according to the configuration information.

In embodiments of the present disclosure, the terminal device may respectively determine a first monitoring capability of the first carrier for scheduling the first carrier, and a monitoring capability of the second carrier for scheduling the first carrier. Alternatively, the terminal device may also determine first monitoring capabilities of the first carrier and the second carrier that are configured to schedule the first carrier, without further determining the second monitoring capability.

If the first monitoring capability determined by the terminal device is the monitoring capabilities of the first carrier and the second carrier that are configured to schedule the first carrier, the terminal device needs to divide, according to the first carrier and the second carrier, the determined first monitoring capability, so as to perform the PDCCH monitoring using the divided monitoring capability.

In some embodiments, the terminal device equally divides the determined first monitoring capability, and subsequent terminal devices use the equally divided monitoring capabilities to perform the PDCCH monitoring on the corresponding carriers. Alternatively, the terminal device divides the first monitoring capability according to a ratio of the subcarrier spacing of the first carrier to the subcarrier spacing of the second carrier, and the subsequent terminal devices perform the PDCCH monitoring on the corresponding carriers according to the divided monitoring capabilities.

Next, how to determine the first monitoring capability and the second monitoring capability will be described.

1. Determining the First Monitoring Capability

The first monitoring capability is determined according to a first total monitoring capability and a first maximum monitoring capability of the first carrier.

The first maximum monitoring capability is a maximum monitoring capability corresponding to the first carrier. The maximum monitoring capability corresponding to the first carrier is the maximum number of candidate PDCCHs that the terminal device can monitor on the first carrier, or the maximum number of PDCCH blind decoding performed by the terminal device on the first carrier, or the maximum number of channel estimations performed by the terminal device for the non-overlapping CCE on the first carrier. The first total monitoring capability is a sum of monitoring capabilities supported by carriers whose subcarrier spacing is a first reference subcarrier spacing.

In embodiments of the present disclosure, the first carrier corresponds to a first subcarrier spacing, and the first maximum monitoring capability corresponding to the first carrier can be determined according to the first subcarrier spacing.

The first subcarrier spacing is indicated by a subcarrier identity. That is, one subcarrier identity corresponds to one subcarrier spacing. For example, when the subcarrier identity is 0, the corresponding subcarrier spacing is 15 KHz. When the subcarrier identity is 1, the corresponding subcarrier spacing is 30 KHz. When the subcarrier identity is 2, the corresponding subcarrier spacing is 60 KHz. When the subcarrier identity is 3, the corresponding subcarrier spacing is 120 KHz.

In some embodiments, the way for determining the first monitoring capability according to the first total monitoring capability and the first maximum monitoring capability of the first carrier may be as follows.

(1) The first monitoring capability is the minimum monitoring capability among the first maximum monitoring capability and the first total monitoring capability.

For example, the monitoring capability being the number of PDCCH monitoring is taken as example for illustration. If the first maximum monitoring capability is times and the first total monitoring capability is 20 times, the terminal device determines that the first monitoring capability is the first maximum monitoring capability.

(2) The first monitoring capability is a product of the minimum monitoring capability among the first maximum monitoring capability and the first total monitoring capability by a first ratio.

For example, the monitoring capability being the number of PDCCH monitoring is taken as example for illustration. If the first maximum monitoring capability is 10 times and the first total monitoring capability is 20 times, then the terminal device determines that the first monitoring capability is the product of the first maximum monitoring capability by the first ratio. If the first ratio is 0.8, it is determined that the first monitoring capability is 8 times.

It should be noted that if the product of the minimum monitoring capability by the first ratio is not an integer, the obtained product needs to be rounded down to determine the obtained integer as the first monitoring capability. For example, if the product of the minimum monitoring capability by the first ratio is 20.3, the first monitoring capability is 20.

(3) The first monitoring capability is the minimum monitoring capability among a reference monitoring capability, and a monitoring capability obtained by multiplying the first total monitoring capability by the first ratio.

For example, the monitoring capability being the number of PDCCH monitoring is taken as example for illustration. If the reference monitoring capability is 10 times, the first total monitoring capability is 20 times, and the first ratio is 0.8, then the monitoring capability obtained by multiplying the first total monitoring capability by the first ratio is 16 times. In this case, the terminal device determines that the first monitoring capability is the reference monitoring capability.

It should be noted that if the determined minimum monitoring capability is the monitoring capability obtained by multiplying the first total monitoring capability by the first ratio, and the monitoring capability is not an integer, the obtained monitoring capability needs to be rounded down, and the resulting integer is determined as the first monitoring capability. For example, if the monitoring capability obtained by multiplying the first total monitoring capability by the first ratio is 26.5, then the first monitoring capability is 26.

(4) The first monitoring capability is the minimum monitoring capability among the first total monitoring capability, and a monitoring capability obtained by multiplying the reference monitoring capability by the first ratio.

For example, the monitoring capability being the number of PDCCH monitoring is taken as example for illustration. If the reference monitoring capability is 10 times, the first total monitoring capability is 20 times, and the first ratio is 0.8, then the monitoring capability obtained by multiplying the reference monitoring capability by the first ratio is 8 times. In this case, the terminal device determines that the first monitoring capability is the monitoring capability obtained by multiplying the reference monitoring capability by the first ratio.

The reference monitoring capability is determined according to the first maximum monitoring capability of the first carrier and the second maximum monitoring capability of the second carrier. The first ratio is not less than 0 and not greater than 1. For example, the first ratio is 0.6, 0.7, or other values.

It should be noted that if the determined minimum monitoring capability is the monitoring capability obtained by multiplying the reference monitoring capability by the first ratio, and the monitoring capability is not an integer, the obtained monitoring capability needs to be rounded down, and the resulting integer is determined as the first monitoring capability. For example, if the monitoring capability obtained by multiplying the reference monitoring capability by the first ratio is 23.3, then the first monitoring capability is 23.

In some embodiments, the way for determining the reference monitoring capability includes any of the following.

(1) The reference monitoring capability is the maximum one among the first maximum monitoring capability and the second maximum monitoring capability.

The second maximum monitoring capability is the maximum monitoring capability corresponding to the second carrier.

For example, the first maximum monitoring capability being the number of non-overlapping CCEs for channel estimation is taken as an example for illustration. If the first maximum monitoring capability is 30 CCEs, and the second maximum monitoring capability is 20 CCEs, the terminal device determines that the reference monitoring capability is the first maximum monitoring capability.

(2) The reference monitoring capability is the minimum one among the first maximum monitoring capability and the second maximum monitoring capability.

For example, the first maximum monitoring capability being the number of non-overlapping CCEs for channel estimation is taken as an example for illustration. If the first maximum monitoring capability is 30 CCEs, and the second maximum monitoring capability is 20 CCEs, the terminal device determines that the reference monitoring capability is the second maximum monitoring capability.

(3) The reference monitoring capability is a sum of a product of the first maximum monitoring parameter by a third ratio, and a product of the second maximum monitoring parameter by a fourth ratio.

The third ratio and the fourth ratio are not less than 0 and not greater than 1.

For example, the first maximum monitoring capability being the number of non-overlapping CCEs for channel estimation is taken as an example for illustration. If the first maximum monitoring capability is 30 CCEs, the second maximum monitoring capability is 20 CCEs, the third ratio is 0.8, and the fourth ratio is 0.5, then the terminal device determines that the reference monitoring capability is 34 CCEs.

It should be noted that embodiments of the present disclosure only take the determination of the reference monitoring capability according to the first maximum monitoring capability and the second maximum monitoring capability as an example for illustration. In another embodiment, since the first maximum monitoring capability is determined according to the first subcarrier spacing, and the second maximum monitoring capability is determined according to the second subcarrier spacing, the reference monitoring capability may also be determined according to the first subcarrier spacing and the second subcarrier spacing.

The reference monitoring capability is determined by using the maximum subcarrier spacing among the first subcarrier spacing and the second subcarrier spacing. Alternatively, the reference monitoring capability is determined by using the minimum subcarrier spacing among the first subcarrier spacing and the second subcarrier spacing.

In some embodiments, the first total monitoring capability is determined based on the number of carriers corresponding to the terminal device and supporting the maximum monitoring capability, the maximum monitoring capability of the carrier whose subcarrier spacing is the first reference subcarrier spacing, and the number of carriers scheduled by the carrier whose subcarrier spacing is the first reference subcarrier spacing.

In some embodiments, the first reference subcarrier spacing is one of:

a first subcarrier spacing of the first carrier, a second subcarrier spacing of the second carrier, the minimum subcarrier spacing among the first subcarrier spacing and the second subcarrier spacing, or the maximum subcarrier spacing among the first subcarrier spacing and the second subcarrier spacing.

In embodiments of the present disclosure, a first reference subcarrier spacing is determined in the above manner, and the subsequent terminal device determines the first total monitoring capability according to the determined first reference subcarrier spacing.

In some embodiments, taking the first reference subcarrier spacing being μ as an example, the first total monitoring capability is expressed by the following formula:

$$M_{PDCCH1}^{total,slot,\mu} = \left\lfloor N_{cells}^{cap} \cdot M_{PDCCH1}^{max,slot,\mu} \cdot N_{cells1}^{DL,\mu} / \sum_{j=0}^{3} N_{cells}^{DL,j} \right\rfloor$$

where, $$N_{cells}^{cap}$$

is the number of carriers corresponding to the terminal device and supporting the maximum monitoring capability, $$M_{PDCCH1}^{max,slot,\mu}$$

is the maximum monitoring capability of a carrier with a subcarrier spacing of μ, $$N_{cells1}^{DL,\mu}$$

is the number of carriers scheduled by the carrier with the subcarrier spacing of μ, $$M_{PDCCH1}^{total,slot,\mu}$$

is the first total monitoring capability, and $$N_{cells}^{DL,j}$$

is the number of carriers scheduled by a carrier with a subcarrier spacing of j. The value of μ is similar to the value of the spacing identity as described above, and will not be repeated here.

In a case that the subcarrier spacing of the first carrier is the same as the subcarrier spacing of the second carrier, the number of carriers scheduled by the first carrier and the second carrier is the number of first carriers or twice the number of first carriers.

For example, in the case that the subcarrier spacing of the first carrier is the same as the sub carrier spacing of the second carrier, as shown in FIG. 3, as an example for illustration, the first carrier is a primary cell, the second carrier is a scheduling secondary cell, the carrier has the subcarrier spacing of 15 KHz, and μ of $$N_{cells}^{DL,\mu}$$

in the above formula for determining the first total monitoring capability is 0 or 1. Then, $$N_{cells}^{DL,0} = 2, \text{ and } N_{cells}^{DL,1} = 1.$$

For another example, as shown in FIG. 3, μ of $$N_{cells}^{DL,\mu}$$

in the above formula for determining the first total monitoring capability is 0 or 1. Then, $$N_{cells}^{DL,0} = 3, \text{ and } N_{cells}^{DL,1} = 1.$$

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

It should be noted that the reference monitoring capability in embodiments of the present disclosure may be the first maximum monitoring capability, or may also be the second maximum monitoring capability. Then, the reference monitoring capability in (3) and (4) among the ways for determining the first monitoring capability in the above embodiments may be replaced by the first maximum monitoring capability or the second maximum monitoring capability.

For example, the first monitoring capability is the minimum monitoring capability among the first maximum monitoring capability, and a monitoring capability obtained by multiplying the first total monitoring capability by the first ratio.

The first monitoring capability is the minimum monitoring capability among the second maximum monitoring capability, and the monitoring capability obtained by multiplying the first total monitoring capability by the first ratio.

The first monitoring capability is the minimum monitoring capability among the first total monitoring capability, and a monitoring capability obtained by multiplying the first maximum monitoring capability by the first ratio.

The first monitoring capability is the minimum monitoring capability among the first total monitoring capability, and a monitoring capability obtained by multiplying the second maximum monitoring capability by the first ratio.

2. Determining the Second Monitoring Capability

The second monitoring capability is determined according to a second total monitoring capability and the second maximum monitoring capability of the second carrier.

The second maximum monitoring capability is a maximum monitoring capability corresponding to the second carrier. The maximum monitoring capability corresponding to the second carrier is the maximum number of candidate PDCCHs that the terminal device can monitor on the second carrier, or the maximum number of PDCCH blind decoding performed by the terminal device on the second carrier, or the maximum number of channel estimations for the non-overlapping CCE performed by the terminal device on the second carrier. The second total monitoring capability is a sum of monitoring capabilities of carriers whose subcarrier spacing is a second reference subcarrier spacing.

In some embodiments, the way for determining the second monitoring capability according to the second total monitoring capability and the second maximum monitoring capability of the second carrier is as follows.

(1) The second monitoring capability is the minimum monitoring capability among the second maximum monitoring capability and the second total monitoring capability.

(2) The second monitoring capability is a product of the minimum monitoring capability among the second maximum monitoring capability and the second total monitoring capability by a second ratio.

(3) The second monitoring capability is the minimum monitoring capability among the reference monitoring capability, and a monitoring capability obtained by multiplying the second total monitoring capability by the second ratio.

(4) The second monitoring capability is the minimum monitoring capability among the second total monitoring capability, and a monitoring capability obtained by multiplying the reference monitoring capability by the second ratio.

The reference monitoring capability is determined according to the first maximum monitoring capability of the first carrier and the second maximum monitoring capability of the second carrier. The second ratio is not less than 0 and not greater than 1.

The reference monitoring capability used for determining the second monitoring capability is similar to the reference monitoring capability used for determining the first monitoring capability in the foregoing embodiments, and details are not repeated here.

In some embodiments, the second total monitoring capability is determined based on the number of carriers corresponding to the terminal device and supporting the maximum monitoring capability, the maximum monitoring capability of the carrier whose subcarrier spacing is the second reference subcarrier spacing, and the number of carriers scheduled by the carrier whose subcarrier spacing is the second reference subcarrier spacing.

In some embodiments, the first reference subcarrier spacing is one of:

a first subcarrier spacing of the first carrier, a second subcarrier spacing of the second carrier, the minimum subcarrier spacing among the first subcarrier spacing and the second subcarrier spacing, or the maximum subcarrier spacing among the first subcarrier spacing and the second subcarrier spacing.

In embodiments of the present disclosure, a second reference subcarrier spacing is determined in the above manner, and the subsequent terminal device determines the second total monitoring capability according to the determined second reference subcarrier spacing.

In some embodiments, taking the second subcarrier spacing of μ as an example, the second total monitoring capability is expressed by the following formula:

$$M_{PDCCH2}^{total,slot,\mu} = \left\lfloor N_{cells}^{cap} \cdot M_{PDCCH2}^{max,slot,\mu} \cdot N_{cells2}^{DL,\mu} / \sum_{j=0}^{3} N_{cells}^{DL,j} \right\rfloor$$

where, $$N_{cells}^{cap}$$

is the number of carriers corresponding to the terminal device and supporting the maximum monitoring capability, $$M_{PDCCH2}^{max,slot,\mu}$$

is the maximum monitoring capability of a carrier with a subcarrier spacing of μ, $$N_{cells2}^{DL,\mu}$$

is the number of carriers scheduled by the carrier with the subcarrier spacing of μ, $$M_{PDCCH2}^{total,slot,\mu}$$

is the second total monitoring capability, and $$N_{cells}^{DL,j}$$

is the number of carriers scheduled by a carrier with a subcarrier spacing of j.

In a case that the subcarrier spacing of the first carrier is the same as the subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

It should be noted that, in embodiments of the present disclosure, the first reference subcarrier spacing and the second reference subcarrier spacing are the same. Then, the first total monitoring capability and the second total monitoring capability may be replaced by each other. For example, the first monitoring capability may be determined according to the first maximum monitoring capability and the second total monitoring capability. Alternatively, the second monitoring capability may be determined according to the second maximum monitoring capability and the first total monitoring capability.

It should be noted that when the first reference subcarrier spacing and the second reference subcarrier spacing are the same in embodiments of the present disclosure, the first total monitoring capability and the second total monitoring capability are the same. That is, the terminal device determines the first monitoring capability and the second monitoring capability according to the first total monitoring capability and the second total monitoring capability being the same with each other.

In a case that the first reference subcarrier spacing and the second reference subcarrier spacing are different, the first total monitoring capability is determined according to the first reference subcarrier spacing, and the second total monitoring capability is determined according to the second reference subcarrier spacing. The first reference subcarrier spacing and the second reference subcarrier spacing are as any of the following cases.

(1) The first reference subcarrier spacing is the first subcarrier spacing, and the second reference subcarrier spacing is the second subcarrier spacing.

(2) The first reference subcarrier spacing is the second subcarrier spacing, and the second reference subcarrier spacing is the first subcarrier spacing.

A first point that needs to be explained is that in embodiments of the present disclosure, the first reference subcarrier spacing being different from the second reference subcarrier spacing is taken as an example for illustration. In this case, the first total monitoring capability and the second total monitoring capability are different. That is, the terminal device respectively determines the respective first monitoring capability and the respective second monitoring capability according to the first total monitoring capability and the second total monitoring capability being different from each other.

A second point that needs to be explained is that in embodiments of the present disclosure, the terminal device directly determining the first monitoring capability and/or the second monitoring capability is only taken as an example for illustration. In another embodiment, the terminal device determines the first monitoring capability and/or the second monitoring capability by using the above manners when a search space carried by the carrier is as any of the following cases.

(1) A Common Search Space (CSS) is carried on the first carrier, and a UE-Special Search Space (USS) is carried on the second carrier.

(2) USS is carried on the first carrier, and CSS is carried on the second carrier.

(3) USS and CSS are carried on the first carrier, and USS is carried on the second carrier.

Next, when the search space carried by the carrier belongs to other situations, the first monitoring capability and the second monitoring capability determined by the terminal device are as any of the following cases.

A first situation: USS is carried only on the first carrier in a first time unit, the first monitoring capability is determined according to the first total monitoring capability and the first maximum monitoring capability of the first carrier, and the second monitoring capability is 0.

The first time unit is a slot, or a sub-slot, or a span, and the span includes at least one symbol.

In some embodiments, determination of the first monitoring capability according to the first total monitoring capability and the first maximum monitoring capability of the first carrier includes any of the following options.

(1) The first monitoring capability is the minimum monitoring capability among the first maximum monitoring capability and the first total monitoring capability.

(2) The first monitoring capability is a product of the minimum monitoring capability among the first maximum monitoring capability and the first total monitoring capability by a first ratio.

(3) The first monitoring capability is the minimum monitoring capability among a reference monitoring capability, and a monitoring capability obtained by multiplying the first total monitoring capability by the first ratio.

(4) The first monitoring capability is the minimum monitoring capability among the first total monitoring capability, and a monitoring capability obtained by multiplying the reference monitoring capability by the first ratio.

The reference monitoring capability is determined according to the first maximum monitoring capability and the second maximum monitoring capability. The first ratio is not less than 0 and not greater than 1.

It should be noted that in embodiments of the present disclosure, the determination of the reference monitoring capability according to the first maximum monitoring capability and the second maximum monitoring capability is only taken as an example for illustration. In another embodiment, since the first maximum monitoring capability is determined according to the first subcarrier spacing, and the second maximum monitoring capability is determined according to the second subcarrier spacing, the reference monitoring capability may also be determined according to the first subcarrier spacing and the second subcarrier spacing.

The reference monitoring capability is determined by using the maximum subcarrier spacing among the first subcarrier spacing and the second subcarrier spacing. Alternatively, the reference monitoring capability is determined by using the minimum subcarrier spacing among the first subcarrier spacing and the second subcarrier spacing.

In addition, the way for determining the first monitoring capability in embodiments of the present disclosure is the same as the way for determining the first monitoring capability in the foregoing embodiments, and details are not repeated here.

It should be noted that, in embodiments of the present disclosure, USS being only carried on the first carrier is taken as an example for illustration. In another embodiment, CSS may also be carried on the first carrier in the first time unit.

A second situation: USS is carried only on the second carrier in a second time unit, the second monitoring capability is determined according to the second total monitoring capability and the second maximum monitoring capability of the second carrier, and the first monitoring capability is 0.

The second time unit is a slot, or a sub-slot, or a span, and the span includes at least one symbol. In some embodiments, determination of the second monitoring capability according to the second total monitoring capability and the second maximum monitoring capability of the second carrier includes any of the following options.

(1) The second monitoring capability is the minimum monitoring capability among the second maximum monitoring capability and the second total monitoring capability.

(2) The second monitoring capability is a product of the minimum monitoring capability among the second maximum monitoring capability and the second total monitoring capability by a second ratio.

(3) The second monitoring capability is the minimum monitoring capability among a reference monitoring capability, and a monitoring capability obtained by multiplying the second total monitoring capability by the second ratio.

(4) The second monitoring capability is the minimum monitoring capability among the second total monitoring capability, and a monitoring capability obtained by multiplying the reference monitoring capability by the second ratio.

The reference monitoring capability is determined according to the first maximum monitoring capability and the second maximum monitoring capability. The second ratio is not less than 0 and not greater than 1.

The way for determining the second monitoring capability in embodiments of the present disclosure is similar to the way for determining the second monitoring capability in the foregoing embodiments, and details are not repeated here.

In some embodiments, the way for determining the reference monitoring capability involved in embodiments of the present disclosure includes any of the following options.

(1) The reference monitoring capability is the maximum one among the first maximum monitoring capability and the second maximum monitoring capability.

(2) The reference monitoring capability is the minimum one among the first maximum monitoring capability and the second maximum monitoring capability.

(3) The reference monitoring capability is a sum of a product of the first maximum monitoring capability by a third ratio, and a product of the second maximum monitoring parameter by a fourth ratio. The third ratio and the fourth ratio are not less than 0 and not greater than 1.

The way for determining the reference monitoring capability in embodiments of the present disclosure is similar to the way for determining the reference monitoring capability in the foregoing embodiments, and details are not repeated here.

In some embodiments, USS being only carried on the second carrier in the second time unit is only taken as example for illustration according to embodiments of the present disclosure. In another embodiment, CSS is not carried on the first carrier in the second time unit.

Embodiments of the present disclosure provide the method for determining the monitoring capabilities of two scheduling carriers configured to schedule the same carrier. The first monitoring capability and/or the second monitoring capability are directly determined. The first monitoring capability and/or the second monitoring capability are used for indicating the capability of the terminal device to monitor PDCCH on the first carrier and the second carrier. This breaks the limitations that the monitoring capability cannot be determined for the two scheduling carriers that schedule the same carrier, thereby improving the capability of the terminal to monitor PDCCH and improving the communication effect.

The determination of the first monitoring capability and/or the second monitoring capability by the terminal device is taken as an example for illustration in embodiments in FIG. 2. In another embodiment, the network device may also determine the first monitoring capability and the second monitoring capability. FIG. 4 illustrates a flowchart of a method for determining a monitoring capability provided by an exemplary embodiment of the present disclosure, which is applied to the network device as shown in FIG. 1. Referring to FIG. 4, the method includes at least some of the following contents.

In 410, the network device determines the first monitoring capability and/or the second monitoring capability.

The first carrier and the second carrier are configured to schedule the first carrier, and the first carrier is different from the second carrier. If a frequency point corresponding to the first carrier is different from a frequency point corresponding to the second carrier, it indicates that the first carrier is different from the second carrier. Alternatively, if a carrier identity corresponding to the first carrier is different from a carrier identity corresponding to the second carrier, it indicates that the first carrier is different from the second carrier. The carrier identity is used to identify the carrier. For example, the carrier identity is 1, 2, 3, or other numerical values.

In embodiments of the present disclosure, the network device configures a plurality of carriers for the terminal device, and the configured first carriers may be scheduled by the first carrier and the second carrier. This also means that the first carrier may be scheduled by itself or by the second carrier in a cross-carrier scheduling manner.

In some embodiments, the first monitoring capability or the second monitoring capability is the number of PDCCH monitoring. Alternatively, the first monitoring capability or the second monitoring capability is the number of non-overlapping CCEs used for channel estimation. The number of CCEs is set by the network device, or set by an operator, or set in other ways, which is not limited in embodiments of the present disclosure.

If the first monitoring capability is the number of PDCCH monitoring, the first monitoring capability is used for indicating the number of PDCCH blind decoding performed by the terminal devices on the first carrier, or for indicating the number of candidate PDCCHs monitored by the terminal device on the first carrier. If the first monitoring capability is the number of non-overlapping CCEs used for channel estimation, the first monitoring capability is used for indicating the number of non-overlapping CCEs that the terminal device uses to perform the channel estimation on the first carrier.

If the second monitoring capability is the number of PDCCH monitoring, the second monitoring capability is used for indicating the number of PDCCH blind decoding performed by the terminal devices on the second carrier, or for indicating the number of candidate PDCCHs monitored by the terminal device on the second carrier. If the second monitoring capability is the number of non-overlapping CCEs used for channel estimation, the second monitoring capability is used for indicating the number of non-overlapping CCEs that the terminal device uses to perform the channel estimation on the second carrier.

It should be noted that in embodiments of the present disclosure, the first carrier and the second carrier are taken as an example for illustration. In another embodiment, the first carrier and the second carrier may also be replaced by a first cell and a second cell. That is, the carrier and the cell are equivalent concepts, and the carrier and the cell may be replaced equally, which are not limited by embodiments of the present disclosure.

In some embodiments, the network device sends configuration information, and the configuration information is used for indicating the first carrier and the second carrier.

In some embodiments, the network device determines the first monitoring capability according to a first total monitoring capability and a first maximum monitoring capability of the first carrier.

The first maximum monitoring capability is the maximum monitoring capability corresponding to the first carrier, and the first total monitoring capability is a sum of monitoring capabilities supported by carriers whose subcarrier spacing is a first reference subcarrier spacing.

In some embodiments, the first reference subcarrier spacing is one of:

a first subcarrier spacing of the first carrier, a second subcarrier spacing of the second carrier, the minimum subcarrier spacing among the first subcarrier spacing and the second subcarrier spacing, or the maximum subcarrier spacing among the first subcarrier spacing and the second subcarrier spacing.

In some embodiments, the first total monitoring capability is determined based on the number of carriers corresponding to the terminal device and supporting the maximum monitoring capability, the maximum monitoring capability of the carrier whose subcarrier spacing is the first reference subcarrier spacing, and the number of carriers scheduled by the carrier whose subcarrier spacing is the first reference subcarrier spacing.

In a case that a subcarrier spacing of the first carrier is the same as a subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

In some embodiments, taking the first reference subcarrier spacing of $\mu$ as an example, the first total monitoring capability is expressed by the following formula:

$$M_{PDCCH1}^{total,slot,\mu} = \left\lfloor N_{cells}^{cap} \cdot M_{PDCCH1}^{max,slot,\mu} \cdot N_{cells1}^{DL,\mu} / \sum_{j=0}^{3} N_{cells}^{DL,j} \right\rfloor$$

where, $$N_{cells}^{cap}$$

is the number of carriers corresponding to the terminal device and supporting the maximum monitoring capability, $$M_{PDCCH1}^{max,slot,\mu}$$

is the maximum monitoring capability of a carrier with a subcarrier spacing of $\mu$, $$N_{cells1}^{DL,\mu}$$

is the number of carriers scheduled by the carrier with the subcarrier spacing of $\mu$, $$M_{PDCCH1}^{total,slot,\mu}$$

is the first total monitoring capability, and $$N_{cells}^{DL,j}$$

is the number of carriers scheduled by a carrier with a subcarrier spacing of j.

In some embodiments, the second monitoring capability is determined according to a second total monitoring capability and the second maximum monitoring capability of the second carrier.

The second maximum monitoring capability is the maximum monitoring capability corresponding to the second carrier, and the second total monitoring capability is a sum of monitoring capabilities of carriers whose subcarrier spacing is a second reference subcarrier spacing.

In some embodiments, the second reference subcarrier spacing is one of:

a first subcarrier spacing of the first carrier, a second subcarrier spacing of the second carrier, the minimum subcarrier spacing among the first subcarrier spacing and the second subcarrier spacing, or the maximum subcarrier spacing among the first subcarrier spacing and the second subcarrier spacing.

In some embodiments, the second total monitoring capability is determined based on the number of carriers corresponding to the terminal device and supporting the maximum monitoring capability, the maximum monitoring capability of the carrier whose subcarrier spacing is the second reference subcarrier spacing, and the number of carriers scheduled by the carrier whose subcarrier spacing is the second reference subcarrier spacing.

In a case that a subcarrier spacing of the first carrier is the same as a subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

In some embodiments, taking the second subcarrier spacing of μ as an example, the second total monitoring capability is expressed by the following formula:

$$M_{PDCCH2}^{total,slot,\mu} = \left\lfloor N_{cells}^{cap} \cdot M_{PDCCH2}^{max,slot,\mu} \cdot N_{cells2}^{DL,\mu} / \sum_{j=0}^{3} N_{cells}^{DL,j} \right\rfloor$$

where, $$N_{cells}^{cap}$$

is the number of carriers corresponding to the terminal device and supporting the maximum monitoring capability, $$M_{PDCCH2}^{max,slot,\mu}$$

is the maximum monitoring capability of a carrier with a subcarrier spacing of μ, $$N_{cells2}^{DL,\mu}$$

is the number of carriers scheduled by the carrier with the subcarrier spacing of μ, $$M_{PDCCH2}^{total,slot,\mu}$$

is the second total monitoring capability, and $$N_{cells}^{DL,j}$$

is the number of carriers scheduled by a carrier with a subcarrier spacing of j.

In some embodiments, CSS is carried on the first carrier, and USS is carried on the second carrier. Alternatively, USS is carried on the first carrier, and CSS is carried on the second carrier. Further alternatively, USS and CSS are carried on the first carrier, and USS is carried on the second carrier.

In some embodiments, USS is carried only on the first carrier in a first time unit, the first monitoring capability is determined according to the first total monitoring capability and the first maximum monitoring capability of the first carrier, and the second monitoring capability is 0.

In some embodiments, the way for determining the first monitoring capability includes any of the following options.

(1) The first monitoring capability is the minimum monitoring capability among the first maximum monitoring capability and the first total monitoring capability.

(2) The first monitoring capability is a product of the minimum monitoring capability among the first maximum monitoring capability and the first total monitoring capability by a first ratio.

(3) The first monitoring capability is the minimum monitoring capability among a reference monitoring capability, and a monitoring capability obtained by multiplying the first total monitoring capability by the first ratio.

(4) The first monitoring capability is the minimum monitoring capability among the first total monitoring capability, and a monitoring capability obtained by multiplying the reference monitoring capability by the first ratio.

The reference monitoring capability is determined according to the first maximum monitoring capability of the first carrier and the second maximum monitoring capability of the second carrier. The first ratio is not less than 0 and not greater than 1.

In some embodiments, CSS is further carried on the first carrier in the first time unit.

In some embodiments, USS is carried only on the second carrier in a second time unit, the second monitoring capability is determined according to the second total monitoring capability and the second maximum monitoring capability of the second carrier, and the first monitoring capability is 0.

In some embodiments, the way for determining the second monitoring capability includes any of the following options.

(1) The second monitoring capability is the minimum monitoring capability among the second maximum monitoring capability and the second total monitoring capability.

(2) The second monitoring capability is a product of the minimum monitoring capability among the second maximum monitoring capability and the second total monitoring capability by a second ratio.

(3) The second monitoring capability is the minimum monitoring capability among a reference monitoring capability, and a monitoring capability obtained by multiplying the second total monitoring capability by the second ratio.

(4) The second monitoring capability is the minimum monitoring capability among the second total monitoring capability, and a monitoring capability obtained by multiplying the reference monitoring capability by the second ratio.

The reference monitoring capability is determined according to the first maximum monitoring capability and the second maximum monitoring capability. The second ratio is not less than 0 and not greater than 1.

In some embodiments, the way for determining the reference monitoring capability includes any of the following options.

(1) The reference monitoring capability is the maximum one among the first maximum monitoring capability and the second maximum monitoring capability.

(2) The reference monitoring capability is the minimum one among the first maximum monitoring capability and the second maximum monitoring capability.

(3) The reference monitoring capability is a sum of a product of the first maximum monitoring capability by a third ratio, and a product of the second maximum monitoring parameter by a fourth ratio.

The third ratio and the fourth ratio are not less than 0 and not greater than 1.

In some embodiments, CSS is further carried on the second carrier in the second time unit.

A process of the step 410 is similar to a process of 210 in the above embodiments, and will not be repeated here.

Embodiments of the present disclosure provide the method for determining the monitoring capabilities of two scheduling carriers configured to schedule the same carrier. The first monitoring capability and/or the second monitoring capability are directly determined. The first monitoring capability and/or the second monitoring capability are used for indicating the capability of the terminal device to monitor PDCCH on the first carrier and the second carrier. This breaks the limitations that the monitoring capability cannot be determined for the two scheduling carriers that schedule the same carrier, thereby improving the capability of the terminal to monitor PDCCH and improving the communication effect.

FIG. 5 illustrates a block diagram of an apparatus for determining a monitoring capability provided by an exemplary embodiment of the present disclosure. The apparatus is provided in a terminal device. Referring to FIG. 5, the apparatus includes: a capability determination module 501, configured to determine a first monitoring capability and/or a second monitoring capability.

The first monitoring capability is a capability of the terminal device to monitor, on a first carrier, a PDCCH configured to schedule the first carrier. The second monitoring capability is a capability of the terminal device to monitor, on a second carrier, the PDCCH configured to schedule the first carrier.

Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier.

In some embodiments, referring to FIG. 6, the apparatus further includes: a receiving module 502, configured to receive configuration information, where the configuration information is used for indicating the first carrier and the second carrier.

In some embodiments, the capability determination module 501 is configured to determine the first monitoring capability according to a first total monitoring capability and a first maximum monitoring capability of the first carrier.

The first maximum monitoring capability is a maximum monitoring capability corresponding to the first carrier. The first total monitoring capability is a sum of monitoring capabilities supported by carriers whose subcarrier spacing is a first reference subcarrier spacing.

In some embodiments, the first reference subcarrier spacing is one of:

a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

In some embodiments, the first total monitoring capability is determined based on the number of carriers corresponding to the terminal device and supporting the maximum monitoring capability, a maximum monitoring capability of a carrier whose subcarrier spacing is the first reference subcarrier spacing, and the number of carriers scheduled by the carrier whose subcarrier spacing is the first reference subcarrier spacing.

In a case that a subcarrier spacing of the first carrier is the same as a subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

In some embodiments, the capability determination module 501 is configured to determine the second monitoring capability according to a second total monitoring capability and a second maximum monitoring capability of the second carrier.

The second maximum monitoring capability is a maximum monitoring capability corresponding to the second carrier. The second total monitoring capability is a sum of monitoring capabilities of carriers whose subcarrier spacing is a second reference subcarrier spacing.

In some embodiments, the second reference subcarrier spacing is one of:

a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

In some embodiments, the second total monitoring capability is determined based on the number of carriers corresponding to the terminal device and supporting the maximum monitoring capability, a maximum monitoring capability of a carrier whose subcarrier spacing is the second reference subcarrier spacing, and the number of carriers scheduled by the carrier whose subcarrier spacing is the second reference subcarrier spacing.

In a case that a subcarrier spacing of the first carrier is the same as a subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

In some embodiments, CSS is carried on the first carrier, and USS is carried on the second carrier.

Alternatively, USS is carried on the first carrier, and CSS is carried on the second carrier.

Alternatively, USS and CSS are carried on the first carrier, and USS is carried on the second carrier.

In some embodiments, USS is only carried on the first carrier in a first time unit, the first monitoring capability is determined according to a first total monitoring capability and a first maximum monitoring capability of the first carrier, and the second monitoring capability is 0.

In some embodiments, the first monitoring capability is a minimum monitoring capability among the first maximum monitoring capability and the first total monitoring capability.

Alternatively, the first monitoring capability is a product of the minimum monitoring capability among the first maximum monitoring capability and the first total monitoring capability by a first ratio.

Alternatively, the first monitoring capability is a minimum monitoring capability among a reference monitoring capability, and a monitoring capability obtained by multiplying the first total monitoring capability by the first ratio.

Alternatively, the first monitoring capability is a minimum monitoring capability among the first total monitoring capability, and a monitoring capability obtained by multiplying the reference monitoring capability by the first ratio.

The reference monitoring capability is determined according to the first maximum monitoring capability and the second maximum monitoring capability. The first ratio is not less than 0 and not greater than 1.

In some embodiments, CSS is further carried on the first carrier in the first time unit.

In some embodiments, USS is only carried on the second carrier in a second time unit, the second monitoring capability is determined according to a second total monitoring capability and a second maximum monitoring capability of the second carrier, and the first monitoring capability is 0.

In some embodiments, the second monitoring capability is a minimum monitoring capability among the second maximum monitoring capability and the second total monitoring capability.

Alternatively, the second monitoring capability is a product of the minimum monitoring capability among the second maximum monitoring capability and the second total monitoring capability by a second ratio.

Alternatively, the second monitoring capability is a minimum monitoring capability among a reference monitoring capability, and a monitoring capability obtained by multiplying the second total monitoring capability by the second ratio.

Alternatively, the second monitoring capability is a minimum monitoring capability among the second total monitoring capability, and a monitoring capability obtained by multiplying the reference monitoring capability by the second ratio.

The reference monitoring capability is determined according to the first maximum monitoring capability and the second maximum monitoring capability. The second ratio is not less than 0 and not greater than 1.

In some embodiments, the reference monitoring capability is a maximum value among the first maximum monitoring capability and the second maximum monitoring capability.

Alternatively, the reference monitoring capability is a minimum value among the first maximum monitoring capability and the second maximum monitoring capability.

Alternatively, the reference monitoring capability is a sum of a product of the first maximum monitoring capability by a third ratio, and a product of the second maximum monitoring parameter by a fourth ratio.

The third ratio and the fourth ratio are not less than 0 and not greater than 1.

In some embodiments, CSS is not carried on the first carrier in the second time unit.

FIG. 7 illustrates a block diagram of an apparatus for determining a monitoring capability provided by an exemplary embodiment of the present disclosure. The apparatus is provided in a network device. Referring to FIG. 7, the apparatus includes: a capability determination module 701, configured to determine a first monitoring capability and/or a second monitoring capability.

The first monitoring capability is a capability of a terminal device to monitor, on a first carrier, a PDCCH configured to schedule the first carrier. The second monitoring capability is a capability of the terminal device to monitor, on a second carrier, the PDCCH configured to schedule the first carrier.

Alternatively, the first monitoring capability is a capability of the terminal device to monitor, on the first carrier and the second carrier, the PDCCH configured to schedule the first carrier.

The first carrier and the second carrier are configured to schedule the first carrier, and the first carrier is different from the second carrier.

In some embodiments, referring to FIG. 8, the apparatus further includes: a sending module 702, configured to send configuration information, where the configuration information is used for indicating the first carrier and the second carrier.

In some embodiments, the capability determination module 701 is configured to determine the first monitoring capability according to a first total monitoring capability and a first maximum monitoring capability of the first carrier.

The first maximum monitoring capability is a maximum monitoring capability corresponding to the first carrier. The first total monitoring capability is a sum of monitoring capabilities supported by carriers whose subcarrier spacing is a first reference subcarrier spacing.

In some embodiments, the first reference subcarrier spacing is one of:

a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

In some embodiments, the first total monitoring capability is determined based on the number of carriers corresponding to the terminal device and supporting the maximum monitoring capability, a maximum monitoring capability of a carrier whose subcarrier spacing is the first reference subcarrier spacing, and the number of carriers scheduled by the carrier whose subcarrier spacing is the first reference subcarrier spacing.

In a case that a subcarrier spacing of the first carrier is the same as a subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

In some embodiments, the capability determination module 701 is configured to determine the second monitoring capability according to a second total monitoring capability and a second maximum monitoring capability of the second carrier.

The second maximum monitoring capability is a maximum monitoring capability corresponding to the second carrier. The second total monitoring capability is a sum of monitoring capabilities of carriers whose subcarrier spacing is a second reference subcarrier spacing.

In some embodiments, the second reference subcarrier spacing is one of:

a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

In some embodiments, the second total monitoring capability is determined based on the number of carriers corresponding to the terminal device and supporting the maximum monitoring capability, a maximum monitoring capability of a carrier whose subcarrier spacing is the second reference subcarrier spacing, and the number of carriers scheduled by the carrier whose subcarrier spacing is the second reference subcarrier spacing.

In a case that a subcarrier spacing of the first carrier is the same as a subcarrier spacing of the second carrier, the number of carriers scheduled by the first carrier and the second carrier is the number of the first carriers or twice the number of the first carriers.

In a case that the subcarrier spacing of the first carrier is different from the subcarrier spacing of the second carrier, the number of carriers scheduled by the first carrier is the number of the first carriers, and the number of carriers scheduled by the second carrier is the number of the first carriers.

In some embodiments, CSS is carried on the first carrier, and USS is carried on the second carrier.

Alternatively, USS is carried on the first carrier, and CSS is carried on the second carrier.

Alternatively, USS and CSS are carried on the first carrier, and USS is carried on the second carrier.

In some embodiments, USS is only carried on the first carrier in a first time unit, the first monitoring capability is determined according to a first total monitoring capability and a first maximum monitoring capability of the first carrier, and the second monitoring capability is 0.

In some embodiments, the first monitoring capability is a minimum monitoring capability among the first maximum monitoring capability and the first total monitoring capability.

Alternatively, the first monitoring capability is a product of the minimum monitoring capability among the first maximum monitoring capability and the first total monitoring capability by a first ratio.

Alternatively, the first monitoring capability is a minimum monitoring capability among a reference monitoring capability, and a monitoring capability obtained by multiplying the first total monitoring capability by the first ratio.

Alternatively, the first monitoring capability is a minimum monitoring capability among the first total monitoring capability, and a monitoring capability obtained by multiplying the reference monitoring capability by the first ratio.

The reference monitoring capability is determined according to the first maximum monitoring capability and the second maximum monitoring capability. The first ratio is not less than 0 and not greater than 1.

In some embodiments, CSS is further carried on the first carrier in the first time unit.

In some embodiments, USS is only carried on the second carrier in a second time unit, the second monitoring capability is determined according to a second total monitoring capability and a second maximum monitoring capability of the second carrier, and the first monitoring capability is 0.

In some embodiments, the second monitoring capability is a minimum monitoring capability among the second maximum monitoring capability and the second total monitoring capability.

Alternatively, the second monitoring capability is a product of the minimum monitoring capability among the second maximum monitoring capability and the second total monitoring capability by a second ratio.

Alternatively, the second monitoring capability is a minimum monitoring capability among a reference monitoring capability, and a monitoring capability obtained by multiplying the second total monitoring capability by the second ratio.

Alternatively, the second monitoring capability is a minimum monitoring capability among the second total monitoring capability, and a monitoring capability obtained by multiplying the reference monitoring capability by the second ratio.

The reference monitoring capability is determined according to the first maximum monitoring capability and the second maximum monitoring capability. The second ratio is not less than 0 and not greater than 1.

In some embodiments, the reference monitoring capability is a maximum value among the first maximum monitoring capability and the second maximum monitoring capability.

Alternatively, the reference monitoring capability is a minimum value among the first maximum monitoring capability and the second maximum monitoring capability.

Alternatively, the reference monitoring capability is a sum of a product of the first maximum monitoring capability by a third ratio, and a product of the second maximum monitoring parameter by a fourth ratio.

The third ratio and the fourth ratio are not less than 0 and not greater than 1.

In some embodiments, CSS is not carried on the first carrier in the second time unit.

FIG. 9 illustrates a schematic structural diagram of a communication device provided by an exemplary embodiment of the present disclosure. The communication device includes: a processor 901, a receiver 902, a transmitter 903, a memory 904, and a bus 905.

The processor 901 includes one or more processing cores. The processor 901 runs a software program and a module to execute various functional applications and perform information processing.

The receiver 902 and the transmitter 903 may be implemented as one communication component. The communication component may be a communication chip.

The memory 904 is connected to the processor 901 through the bus 905.

The memory 904 may be configured to store at least one program code. The processor 901 is configured to execute the at least one program code, to implement various steps in the foregoing method embodiments.

In addition, the communication device may be a terminal device or a network device. The memory 904 may be implemented by a volatile or non-volatile storage device of any type or a combination thereof. The volatile or non-volatile storage device includes but is not limited to: a magnetic disk or an optical disc, an Electrically-Erasable Programmable Read Only Memory (EEPROM), an Erasable Programmable Read Only Memory (EPROM), a Static Random Access Memory (SRAM), a Read-Only Memory (ROM), a magnetic memory, a flash memory, or a Programmable Read-Only Memory (PROM).

In an exemplary embodiment, there is further provided a computer-readable storage medium, having executable program codes stored thereon. The executable program codes are loaded and executed by a processor to implement the method for determining the monitoring capability performed by the communication device provided by the above various method embodiments.

In an exemplary embodiment, there is provided a chip, including a programmable logic circuit and/or program instructions. The chip is configured to, when running on a terminal device or a network device, implement the method for determining the monitoring capability provided by the above various method embodiments.

In an exemplary embodiment, there is provided a computer program product, which is configured to, when executed by a processor of a terminal device or a network device, implement the method for determining the monitoring capability provided by the above various method embodiments.

A person of ordinary skills in the art can understand that all or part of the steps in the above embodiments may be implemented by hardware, or by a program to instruct relevant hardware to complete. The program may be stored in a computer-readable storage medium. The above-mentioned storage medium may be a read-only memory, a magnetic disk, or an optical disk.

The foregoing descriptions are only optional embodiments of the present disclosure, and are not intended to limit the present disclosure. Any modification, equivalent replacement, improvement, and the like made within the spirit and principle of the present disclosure shall be included in the protection scope of the present disclosure.

What is claimed is:

1. A method for determining a monitoring capability, applied to a terminal device, and comprising:
    determining a first monitoring capability and/or a second monitoring capability;
    wherein:
        the first monitoring capability is a capability of the terminal device to monitor, on a first carrier, a Physical Downlink Control Channel (PDCCH) configured to schedule the first carrier, and the second monitoring capability is a capability of the terminal device to monitor, on a second carrier, the PDCCH configured to schedule the first carrier, or
        the first monitoring capability is a capability of the terminal device to monitor, on the first carrier and the second carrier, the PDCCH configured to schedule the first carrier; and
    wherein:
        the first carrier and the second carrier are configured to schedule the first carrier, and the first carrier is different from the second carrier;
        the first monitoring capability is a product of a minimum monitoring capability among a first maximum monitoring capability and a first total monitoring capability by a first ratio, the first ratio being larger than or equal to 0 and smaller than 1; and
        the first maximum monitoring capability is a maximum monitoring capability corresponding to the first carrier, and the first total monitoring capability is a sum of monitoring capabilities supported by carriers whose subcarrier spacing is a first reference subcarrier spacing.

2. The method according to claim 1, wherein the method further comprises:
    receiving configuration information, wherein the configuration information is used for indicating the first carrier and the second carrier.

3. The method according to claim 1, wherein determining the first monitoring capability and/or the second monitoring capability comprises:
    determining the first monitoring capability according to the first total monitoring capability and the first maximum monitoring capability of the first carrier.

4. The method according to claim 3, wherein the first reference subcarrier spacing is one of:
    a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

5. The method according to claim 3, wherein:
    the first total monitoring capability is determined based on a number of carriers corresponding to the terminal device and supporting a maximum monitoring capability, a maximum monitoring capability of a carrier whose subcarrier spacing is the first reference subcarrier spacing, and a number of carriers scheduled by the carrier whose subcarrier spacing is the first reference subcarrier spacing;
    in a case that a subcarrier spacing of the first carrier is the same as a subcarrier spacing of the second carrier, a number of carriers scheduled by the first carrier and the second carrier is a number of the first carriers or twice the number of the first carriers; and
    in a case that the subcarrier spacing of the first carrier is different from the subcarrier spacing of the second carrier, a number of carriers scheduled by the first carrier is the number of the first carriers, and a number of carriers scheduled by the second carrier is the number of the first carriers.

6. The method according to claim 1, wherein determining the first monitoring capability and/or the second monitoring capability comprises:
    determining the second monitoring capability according to a second total monitoring capability and a second maximum monitoring capability of the second carrier,
    wherein, the second maximum monitoring capability is a maximum monitoring capability corresponding to the second carrier, and the second total monitoring capability is a sum of monitoring capabilities of carriers whose subcarrier spacing is a second reference subcarrier spacing.

7. The method according to claim 6, wherein the second reference subcarrier spacing is one of:
    a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

8. The method according to claim 6, wherein:
    the second total monitoring capability is determined based on a number of carriers corresponding to the terminal device and supporting a maximum monitoring capability, a maximum monitoring capability of a carrier whose subcarrier spacing is the second reference subcarrier spacing, and a number of carriers scheduled by the carrier whose subcarrier spacing is the second reference subcarrier spacing;

in a case that a subcarrier spacing of the first carrier is the same as a subcarrier spacing of the second carrier, a number of carriers scheduled by the first carrier and the second carrier is a number of the first carriers or twice the number of the first carriers; and in a case that the subcarrier spacing of the first carrier is different from the subcarrier spacing of the second carrier, a number of carriers scheduled by the first carrier is the number of the first carriers, and a number of carriers scheduled by the second carrier is the number of the first carriers.

9. The method according to claim 6, wherein:

the second monitoring capability is a minimum monitoring capability among the second maximum monitoring capability and the second total monitoring capability; or the second monitoring capability is a product of the minimum monitoring capability among the second maximum monitoring capability and the second total monitoring capability by a second ratio; or the second monitoring capability is a minimum monitoring capability among a reference monitoring capability, and a monitoring capability obtained by multiplying the second total monitoring capability by the second ratio; or the second monitoring capability is a minimum monitoring capability among the second total monitoring capability, and a monitoring capability obtained by multiplying the reference monitoring capability by the second ratio, wherein the reference monitoring capability is determined according to the first maximum monitoring capability and the second maximum monitoring capability, and the second ratio is not less than 0 and not greater than 1.

10. A terminal device, comprising:

a processor;

a transceiver, connected to the processor; and a memory, configured to store executable program codes for the processor, wherein the processor is configured to load and execute the executable program codes to perform a method for determining a monitoring capability, comprising:

determining a first monitoring capability and/or a second monitoring capability;

wherein:

the first monitoring capability is a capability of the terminal device to monitor, on a first carrier, a Physical Downlink Control Channel (PDCCH) configured to schedule the first carrier, and the second monitoring capability is a capability of the terminal device to monitor, on a second carrier, the PDCCH configured to schedule the first carrier, or the first monitoring capability is a capability of the terminal device to monitor, on the first carrier and the second carrier, the PDCCH configured to schedule the first carrier; and wherein:

the first carrier and the second carrier are configured to schedule the first carrier, and the first carrier is different from the second carrier;

the first monitoring capability is a product of a minimum monitoring capability among a first maximum monitoring capability and a first total monitoring capability by a first ratio, the first ratio being larger than or equal to 0 and smaller than 1; and the first maximum monitoring capability is a maximum monitoring capability corresponding to the first carrier, and the first total monitoring capability is a sum of monitoring capabilities supported by carriers whose subcarrier spacing is a first reference subcarrier spacing.

11. The terminal device according to claim 10, wherein the method further comprises:

receiving configuration information, wherein the configuration information is used for indicating the first carrier and the second carrier.

12. The terminal device according to claim 10, wherein determining the first monitoring capability and/or the second monitoring capability comprises:

determining the first monitoring capability according to the first total monitoring capability and the first maximum monitoring capability of the first carrier.

13. The terminal device according to claim 12, wherein the first reference subcarrier spacing is one of:

a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

14. The terminal device according to claim 12, wherein:

the first total monitoring capability is determined based on a number of carriers corresponding to the terminal device and supporting a maximum monitoring capability, a maximum monitoring capability of a carrier whose subcarrier spacing is the first reference subcarrier spacing, and a number of carriers scheduled by the carrier whose subcarrier spacing is the first reference subcarrier spacing;

in a case that a subcarrier spacing of the first carrier is the same as a subcarrier spacing of the second carrier, a number of carriers scheduled by the first carrier and the second carrier is a number of the first carriers or twice the number of the first carriers; and in a case that the subcarrier spacing of the first carrier is different from the subcarrier spacing of the second carrier, a number of carriers scheduled by the first carrier is the number of the first carriers, and a number of carriers scheduled by the second carrier is the number of the first carriers.

15. A network device, comprising:

a processor;

a transceiver, connected to the processor; and a memory, configured to store executable program codes for the processor, wherein the processor is configured to load and execute the executable program codes to perform a method for determining a monitoring capability, comprising:

determining a first monitoring capability and/or a second monitoring capability;

wherein:

the first monitoring capability is a capability of a terminal device to monitor, on a first carrier, a PDCCH configured to schedule the first carrier, and the second monitoring capability is a capability of the terminal device to monitor, on a second carrier, the PDCCH configured to schedule the first carrier, or the first monitoring capability is a capability of the terminal device to monitor, on the first carrier and the second carrier, the PDCCH configured to schedule the first carrier; and wherein:

the first carrier and the second carrier are configured to schedule the first carrier, and the first carrier is different from the second carrier;

the first monitoring capability is a product of a minimum monitoring capability among a first maximum monitoring capability and a first total monitoring capability by a first ratio, the first ratio being larger than or equal to 0 and smaller than 1; and the first maximum monitoring capability is a maximum monitoring capability corresponding to the first carrier, and the first total monitoring capability is a sum of monitoring capabilities supported by carriers whose subcarrier spacing is a first reference subcarrier spacing.

16. The network device according to claim 15, wherein the method further comprises:

sending configuration information, wherein the configuration information is used for indicating the first carrier and the second carrier.

17. The network device according to claim 15, wherein determining the first monitoring capability and/or the second monitoring capability comprises:

determining the first monitoring capability according to the first total monitoring capability and the first maximum monitoring capability of the first carrier.

18. The network device according to claim 17, wherein the first reference subcarrier spacing is one of:

a first subcarrier spacing of the first carrier, a second subcarrier spacing of the second carrier, a minimum subcarrier spacing among the first subcarrier spacing and the second subcarrier spacing, or a maximum subcarrier spacing among the first subcarrier spacing and the second subcarrier spacing.

19. The network device according to claim 17, wherein:

the first total monitoring capability is determined based on a number of carriers corresponding to the terminal device and supporting a maximum monitoring capability, a maximum monitoring capability of a carrier whose subcarrier spacing is the first reference subcarrier spacing, and a number of carriers scheduled by the carrier whose subcarrier spacing is the first reference subcarrier spacing;

in a case that a subcarrier spacing of the first carrier is the same as a subcarrier spacing of the second carrier, a number of carriers scheduled by the first carrier and the second carrier is a number of the first carriers or twice the number of the first carriers; and in a case that the subcarrier spacing of the first carrier is different from the subcarrier spacing of the second carrier, a number of carriers scheduled by the first carrier is the number of the first carriers, and a number of carriers scheduled by the second carrier is the number of the first carriers.

* * * * *